United States Patent [19]

Eiermann et al.

[11] Patent Number: 5,131,759
[45] Date of Patent: Jul. 21, 1992

[54] TEMPERATURE PROBE

[75] Inventors: Kurt Eiermann, Pfungstadt; Karl Ehinger, Karlstein, both of Fed. Rep. of Germany

[73] Assignee: Sensycon Gesellschaft fur industrielle Sensor-Systeme und ProzeBleitechnik mbH, Fed. Rep. of Germany

[21] Appl. No.: 789,637

[22] Filed: Nov. 12, 1991

Related U.S. Application Data

[63] Continuation of Ser. No. 570,733, Aug. 22, 1990, abandoned.

[30] Foreign Application Priority Data

Sep. 8, 1989 [DE] Fed. Rep. of Germany ....... 3929993

[51] Int. Cl.⁵ ..................... G01K 1/08; G01K 7/00
[52] U.S. Cl. ........................... 374/208; 374/185
[58] Field of Search ............. 374/208, 209, 158, 139, 374/140, 185; 136/230, 232, 233, 234, 231

[56] References Cited

U.S. PATENT DOCUMENTS

| | | | |
|---|---|---|---|
| 3,011,006 | 11/1961 | Nicholson et al. | 136/234 |
| 3,097,973 | 7/1963 | Wieszeck | 136/234 |
| 3,537,911 | 11/1970 | Hynd | 136/234 |
| 3,672,216 | 6/1972 | Schraeder | 136/221 |
| 3,802,926 | 4/1974 | Blencowe | 136/232 |
| 3,923,552 | 12/1975 | Parris | 374/208 |
| 3,960,604 | 6/1976 | Heitzinger et al. | 136/232 |
| 4,336,713 | 6/1982 | Meyer | 374/197 |
| 4,617,985 | 10/1986 | Triggs et al. | 374/57 |
| 4,830,515 | 5/1989 | Cortes | 374/208 |
| 4,871,263 | 10/1989 | Wilson | 374/139 |

FOREIGN PATENT DOCUMENTS

| | | | |
|---|---|---|---|
| 0078675 | 10/1989 | European Pat. Off. | |
| 0208316 | 1/1908 | Fed. Rep. of Germany | 136/232 |
| 1773577 | 4/1972 | Fed. Rep. of Germany | |
| 0314427 | 12/1988 | Japan | 374/208 |

Primary Examiner—William A. Cuchlinski, Jr.
Assistant Examiner—Diego F. F. Gutierrez
Attorney, Agent, or Firm—Cushman, Darby & Cushman

[57] ABSTRACT

A temperature probe (20) is provided which comprises a sensor (22) mounted within a protecting tube (38). A gap is defined between the sensor (22) and the protecting tube (38). The gap (46) between the sensor and the protecting tube is filled with a dry gas such a helium.

15 Claims, 1 Drawing Sheet

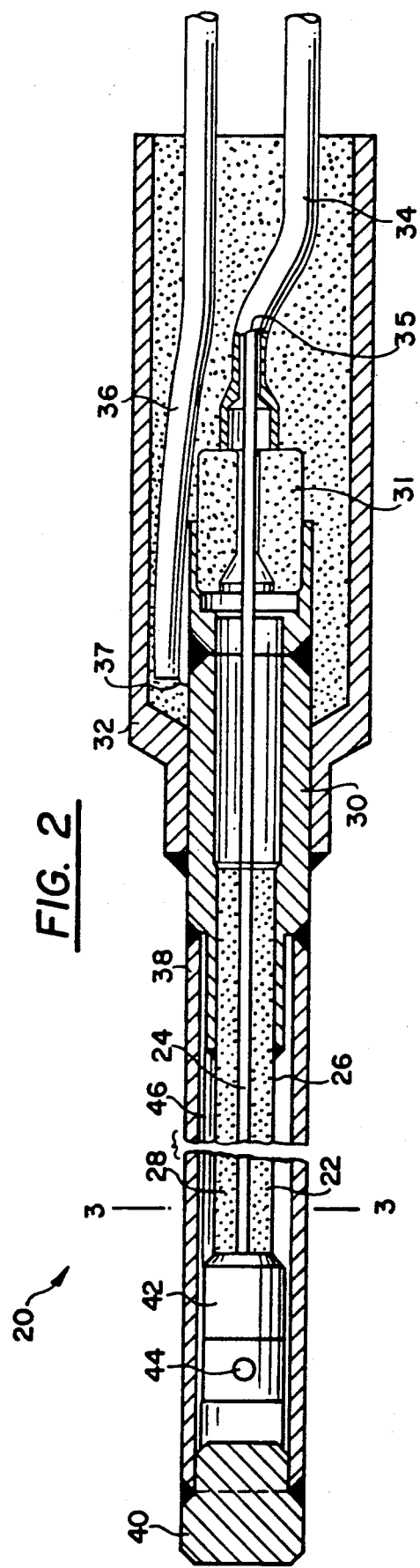
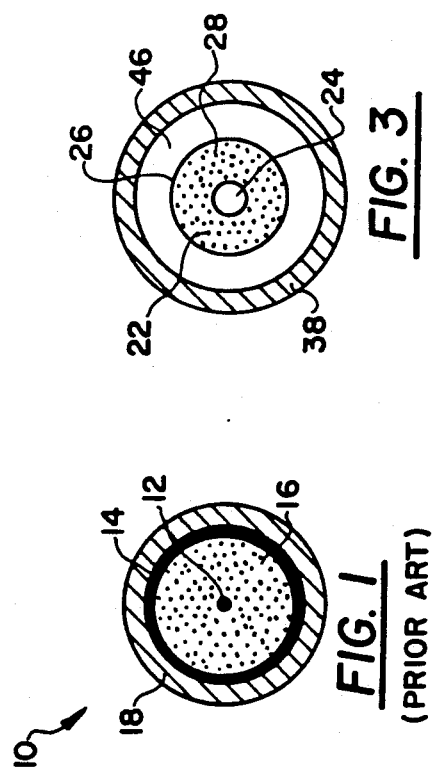
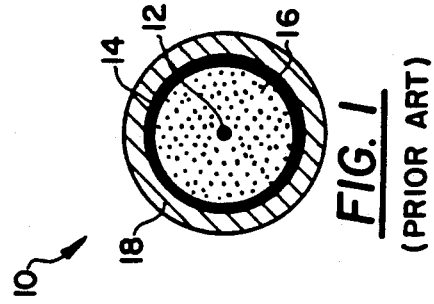

TEMPERATURE PROBE

This is a continuation of application Ser. No. 570,733, filed on Aug. 22, 1990, now abandoned.

BACKGROUND OF THE INVENTION

1. Field of the Invention

The invention relates to a temperature probe for large surfaces, comprising at least two elongated conductors, space from each other and connected through a semi-conducting substance, such substance acting as a sensor, and said sensor perhaps closely shielded by a tube-like metallic sleeve.

2. Description of the Related Art

Temperature sensors are, for example, known from DE-B-17 73 577 or EP-B-0 078 675. The temperature sensor may thus consist of a long nickel wire coaxially surrounded by a nickel tube. To provide connection between the connecting materials, the tube is filled with a semi-conducting substance consisting of nickel oxide. Temperatures are sensed by the electrical resistance between the nickel conductors, said resistance substantially being determined by the semi-conducting substance in place between the conductors. Even at a locally narrowly circumscribed and relatively small temperature rise ("hot spot"), the electrical resistance between the conductors, determined by the high negative temperature coefficient of the electrical resistance of nickel oxide, drops strongly and can be recorded by a measuring device attached at the ends of the conductors. To permit measurement of said electrical resistance, the inner conductor is passed to the outside through a gas-tight, electrically insulating feedthrough. The latter is connected, via a takeup tube, with the protecting tube of the sensor. Nickel oxide being strongly hygroscopic, care must be taken to see that moisture cannot penetrate. Otherwise, hot spots would be simulated which actually are not there, namely where said penetrated moisture produces a short circuit between the electrical conductors. In this case, the temperature sensor would cease to work, with the result that temperature changes can no longer be recorded.

A known procedure is to provide protection against penetrated moisture by closely surrounding the outer nickel tube with a protective sheath which may consist of high-grade steel or Inconel. Such a sheath may be formed by cold-welding to the nickel tube. As similar temperature sensors are often placed on the monitored surface, such as a high-pressure temperature reactor, in a serpentine pattern, the risk still is that said sheath develops needle-like cracks and becomes leaky.

In another known temperature sensors two wires of different materials forming a thermocouple are placed without contact in a protecting tube, the tube itself is filled with a semiconducting substance. The two wires act as a thermocouple as soon as the electrical resistance of the semiconductor, following a rise in temperature, breaks down at one location and the two wires short-circuit at this location to form a measuring point. However, thermocouple arrangements of this type have the disadvantage that when a short-circuit happens through penetrated moisture it cannot be determined whether an unacceptable temperature rise has occurred, or whether the signal was prompted by penetrating liquid.

SUMMARY OF THE INVENTION

It is an object of the present invention is to provide an improved temperature sensor of the type referred to above such that adequate protection against the penetration of moisture and thus high functional reliability is ensured, at the same time excluding unwanted inertia with respect to the recording of unacceptable temperature rises.

The task is substantially solved within the scope of the present invention in that the temperature probe has a protecting tube surrounding the sensor at a distance, the tube filled with a dry gas. The gas may be a noble gas, preferably helium.

The suggestion made by the inventor ensures that the sensor proper or the state-of-the-art sheath closely surrounding the sensor has no direct contact with the environment. Rather, a protecting tube is provided which offers adequate shielding, without having a negative impact on the conduction of temperature towards the sensor. Especially the use of helium as a dry gas has the advantage that heat is well conducted between the protecting tube and the sensor. Consequently, the design of the temperature probe according to the invention does not result in inertia which negatively impacts the controlling function.

Another advantage that comes with the use of helium is that, should any leakage occur, a helium snifter may be used to easily locate and correct such leakage.

The risk of cracks and the like is further reduced in that the protecting tube is made of high-grade steel or Inconel formed by seamless annealing. As wall thicknesses are in the range of 0.5 mm through 1.0 mm, there is added assurance that, if the temperature probe is laid out in a meandering, serpentine or curved pattern, the risk of damaging the protecting tubing is excluded, a damage which may result in leakiness.

In order to introduce the sensor smoothly into the protecting tube, a specific embodiment of the invention provides that the sensor, at one end, has a tail piece permitting easy handling during introduction into the protecting tube.

The protecting tube itself may at one end be connected to a short larger-diameter protecting tube—in the following called "connecting or plug tube"—which is connected to the feedthrough portion of the sensor, is for example welded gas tight, and at the other end has a plug. The latter arrangement permits easy filling of the protecting tube with the dry gas, in particular helium, and subsequent tight sealing.

BRIEF DESCRIPTION OF THE DRAWINGS

Further details, advantages and characteristics of the invention result not only from the claims, the characteristics derived therefrom—singly and/or in combination—, but also from the following description of a preferred embodiment shown in the drawing.

FIG. 1 is a sectional view of a temperature probe according to the state of the art, FIG. 2 is a logitudinal section of a temperature controller according to the invention, and FIG. 3 is a sectional view along the line III—III in FIG. 2.

DETAILED DESCRIPTION OF A PREFERRED EMBODIMENT

FIG. 1 is a sectional view of a state-of-the-art sensor (10) fitted to a temperature controller. This may be a temperature controller such as described, for example, in DE-B-17 73 577. Sensor (10) comprises an inner nickel conductor (12) in the form of a wire coaxially surrounded by an outer tube-shaped nickel conductor (14). The tube, that is, the region between conductors (12) and (14) is filled with a semi-conducting substance (16) made of nickel oxide. The electrical resistance of nickel oxide (16) has a high negative temperature coefficient so that the resistance drops when the temperature rises. This is measured and recorded by a circuit element connected to conductors (12) and (14).

As the nickel oxide is strongly hygroscopic, the outer conductor (14) is surrounded by a protective sheath (18) which may, for example, consist of high-grade steel or Inconel or other suitable material. Protective sheath (18) is, so to speak, "shrunk on" to sensor (10) consisting of conductors (12) and (14) and the semi-conducting material (16).

FIGS. 2 and 3 show an inventive temperature probe (20) which, in respect of its sensor (22), may be laid out as described in FIG. 1. An inner nickel conductor (24) is surrounded by a tube-like outer nickel conductor (26). The space between conductors (24) and (26) is filled with a semi-conducting substance in the form of nickel oxide (28). Outer conductor (26) may also be surrounded by a protective sheath, not shown. This would then be closely placed onto outer conductor (26).

Sensor (22) is received by a tube-shaped holding device (30) fitted with a gas-tight current feedthrough (31) which, in turn, is surrounded by a plug tube (32). Within plug tube (32) there is electrical contact between conductors (24) and (26), for example, to copper strands (34) and (36) leading to measuring or evaluation devices (not shown), for example, through connecting, welding or the like shown schematically at 35 and 37, respectively. To make sure that moisture cannot penetrate into the inside of the plug tube side, plug tube (32) is cast.

According to the invention, sensor (22) is surrounded with, and distanced from, protecting tube (38), which on the one hand is connected to supporting tube (30), such connection producing a sealing effect, and on the other can be sealed with end plug (40). Space (46) between sensor (22), that is, between outer conductor (26) or a protective heath enclosing it and the inner wall of protecting tube (38) is filled with a dry gas, preferably helium. This ensures proper heat conduction between protecting tube (38) and sensor (22). At the same time, there is adequate protection against moisture.

Protecting tube (38) is made preferably of high-grade steel or Inconel and has a wall thickness of 0.5 mm through 1 mm. The tube itself is seamlessly annealed, so no welding seams exist that might result in leakage. The outer diameter of the protecting tube is preferably six millimeters.

The size of the inner diameter $I_d$ of protecting tube (38) in relation to outer diameter $A_d$ of sensor (22) is preferably $$I_d : A_d \approx 2:1 \text{ up to } 3:2.$$

To permit smooth introduction of sensor (22), possibly several meters long, into the protecting tube, the former has a tail piece (42) fitted with means for fastening a pull element, such as a pull wire. In the present embodiment, this is a cylinder end piece provided with bore (44) which helps to pull sensor (22) into protecting tube (38). Plug tube (32) is then connected with takeup tube (30). Space (46) between sensor (22) and protecting tube (38) is then filled with the dry gas, such as helium. Finally, the protecting tube is sealed with end plug (40).

Sensor (22) as described before may also be substituted with a thermocouple likewise referred to in DE-A-17 73 577. This arrangement also makes sure that, due to protecting tube (38) and space (46) filled with dry gas and provided between protecting tube (38) and sensor (22), moisture can normally not penetrate, so that high functional efficiency and a long operating life of the temperature probe are ensured.

We claim:

1. A temperature probe for monitoring the temperature of a large surface comprising at least two elongated electrical conductors, spaced from each other and connected through a semiconducting substance, said two conductors and said semiconducting substance defining a sensor means for monitoring the temperature along the length of said conductors, and a protecting tube mounted in surrounding relation to said sensor means and spaced therefrom to define a gap void of any structure between said tube and said sensor means, said gap being filled with a dry gas.

2. Temperature probe as defined in claim 1, wherein the gas is noble gas.

3. Temperature probe as defined in claim 2, wherein the gas is helium.

4. Temperature probe as defined in claim 1, wherein the protecting tube consists of high-grade steel or Inconel.

5. Temperature probe as defined in claim 1, wherein the protecting tube is seamlessly annealed.

6. Temperature probe as defined in claim 1, wherein the wall thickness of the protecting tube is 0.5 mm through 1 mm, and the outer diameter of the protecting tube is preferably 6 mm.

7. Temperature probe as defined in claim 1, wherein said sensor means is fitted with a tail piece for permitting easy handling during introduction into the protecting tube.

8. Temperature probe as defined in claim 1, wherein said protecting tube is at one end tightly connected with a plug tube and at the other end is sealed with a plug.

9. A temperature probe for monitoring the temperature of a large surface comprising an inner conductor in form of a wire coaxially and at a distance surrounded by an outer tube-shaped conductor, semiconductor material filled in the space between said inner conductor and said outer conductor, said inner and outer conductors and said semiconductor material defining a sensor means for monitoring the temperature along the common length of said conductors, and a protecting tube mounted in surrounding relation to said outer conductor and spaced therefrom to define a gap void of any structure between said protecting tube and said outer conductor, said gap being filled with a dry gas.

10. Temperature probe as defined in claim 9, wherein the gas is a noble gas.

11. Temperature probe as defined in claim 10, wherein the gas is helium.

12. Temperature probe as defined in claim 9, wherein the protecting tube is seamlessly annealed.

13. Temperature probe as defined in claim 9, wherein the wall thickness of the protecting tube is 0.5 mm through 1 mm, and the outer diameter of the protecting tube is preferably 6 mm.

14. Temperature probe as defined in claim 9, wherein said sensor means is fitted with a tail piece for permitting easy handling during introduction into the protecting tube.

15. Temperature probe as defined in claim 9, wherein said protecting tube is at one end tightly connected with a plug tube and at the other end is sealed with a plug.

* * * * *